March 17, 1959
D. V. SHERBAN
2,878,011
METALLURGICAL FURNACE
Filed Dec. 3, 1954
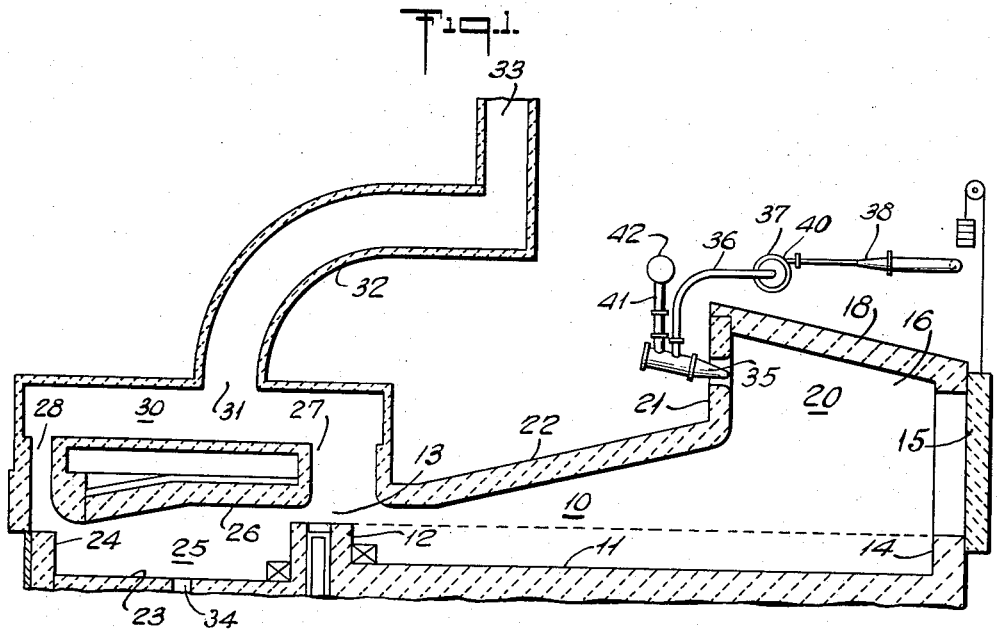
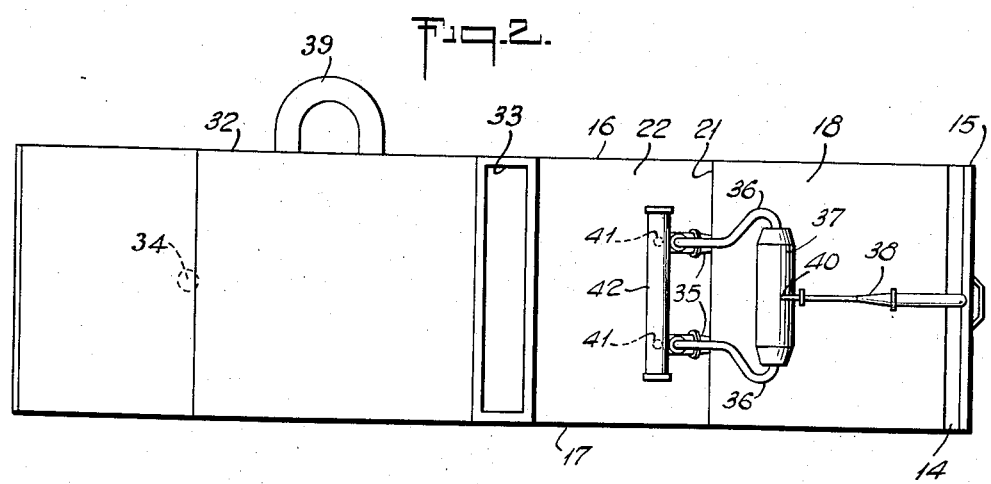
INVENTOR
DANIEL V. SHERBAN
BY
ATTORNEY

United States Patent Office 2,878,011
Patented Mar. 17, 1959

2,878,011
METALLURGICAL FURNACE

Daniel V. Sherban, Keyport, N. J., assignor to The Babcock & Wilcox Company, New York, N. Y., a corporation of New Jersey Application December 3, 1954, Serial No. 472,905

4 Claims. (Cl. 266—33)

The present invention relates to fuel-fired metallurgical melting furnaces, and more particularly to aluminum melting furnaces fired by pulverized coal.

Heretofore, fuel-fired aluminum melting furnaces have been seriously troubled by contamination of the aluminum where contamination may occur irrespective of the fuel used. The aluminum product from such melting furnaces has been contaminated in certain fuel-fired installations either by the presence of ash, by oxidation of the metal or by the presence of hydrogen in the aluminum castings, and sometimes by two or more of these contaminants. The presence of ash and oxidized metal in the cast aluminum is fundamentally caused by the type of fuel used, and the application of that fuel to the furnace. It has been discovered that the presence of hydrogen in the aluminum castings is apparently a result of improper combustion conditions adjacent the molten aluminum where water vapor in the hot heating gases may be dissociated, at least in part, to release free hydrogen. The water vapor in the hot gaseous products of combustion may result from the combustion of hydrogen in the fuel, or may occur by evaporation of moisture in the fuel itself.

Molten aluminum has an affinity for hydrogen, and even minor quantities of hydrogen in the hot gases in contact with the molten aluminum will be absorbed. Aluminum billets containing hydrogen are subject to rejection, since a size reduction of the billets discloses imperfections which will occur in the aluminum products.

In accordance with the present invention I provide an aluminum melting furnace which is constructed and arranged wherein a fuel, such as pulverized coal for example, is burned in suspension without encountering the previous difficulties of aluminum contamination either by reason of ash or hydrogen inclusions, or by excessive oxidation of the metal. This is accomplished by a novel arrangement whereby the burning stream of pulverized coal and the gaseous products of combustion therefrom moves through an extended path of travel within the furnace while in radiant heat exchange relation with the molten aluminum so as to avoid the dissociation of water vapor while the hot gases are in convection contact with the molten aluminum.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of the invention.

Of the drawings:

Fig. 1 is an elevation, in section, of an aluminum melting and holding furnace constructed in accordance with the present invention; and Fig. 2 is a plan of the furnace shown in Fig. 1.

In the embodiment of the invention shown in the drawings, an aluminum melting furnace fired by pulverized coal is combined with a holding furnace to provide a source of molten aluminum for billet casting purposes. The combination of a melting and holding furnace is conventional practice in the casting of light metal billets where the source of the metal is scrap or pig.

Referring to the drawings, Fig. 1 illustrates an aluminum melting furnace 10 having a shallow hearth 11 in the lower portion thereof where the depth of the molten metal on the hearth is limited by the height of a bridge wall 12 positioned near the gas discharge end 13 of the furnace 10. The forward or front wall 14 of the furnace is conveniently provided with a movable door 15 for the charging of scrap or pig aluminum into the furnace. The side walls 16 and 17 of the furnace cooperate with the roof 18 to provide an upwardly extended combustion space 20 in the forward part of the furnace adjacent the front wall 14 thereof. A substantially upright wall 21 is provided intermediate the length of the furnace 10 to extend transversely thereacross and to provide the rearward boundary of the upward extended combustion space 20. The rearward portion 22 of the furnace roof 18 inclines downwardly from the lower end of the upright wall 21 to a position spaced upwardly from the top of the bridge wall 12.

The bridge wall 12 also defines the forward edge of a holding furnace 23 of greater depth than the melting furnace hearth 11 and cooperates with an extension of the side walls 16 and 17, and a transverse rear wall 24 to form a storage space 25 for molten metal. The holding furnace is provided with a suspended roof 26 and spaced rearwardly of the melting furnace roof 22 to provide a gas outlet passageway 27 therebetween. The rearward end of the suspended roof 26 is spaced from the rear wall 24 of the holding furnace 23 to provide a separate gas outlet 28 for the holding furnace 23. The gases of combustion discharging from the melting furnace 10 and, at least in part, from the holding furnace 23 pass through the outlet 27 and are combined above the suspended roof 26 in an enlarged chamber 30 with gases from the outlet 28.

A gas outlet 31 for the combined gases is provided in the upper portion of the chamber 30. A refractory lined duct 32 connects the flue gas outlet 31 with a stack 33 from which the flue gases are exhausted to the atmosphere. Conventional practice is to provide the holding furnace 23 with a source of heat which may take the form of electric heating units or one or more fuel burners for the introduction of, for example, natural gas. The amount of heat added to the holding furnace need only be sufficient to compensate for radiation losses so as to maintain the aluminum at a proper pouring temperature.

The molten aluminum passes by gravity from the melting furnace 10 to the holding furnace 23 through an exterior duct 39 positioned on the outside of the furnace wall 16. The duct 39 is schematically shown in Fig. 2. The molten metal is discharged from the holding furnace 23 through a valve controlled duct or conduit 34 leading from the lower rear portion of the holding furnace 23 to the molten metal distribution system which is connected with the casting apparatus (not shown).

As shown in Figs. 1 and 2, the furnace 10 is provided with a pair of transversely spaced burners 35 positioned in the upright wall 21. The burners 35 receive pulverized coal through individual pipes 36 which are connected at their inlet ends with a pulverized coal distributor 37. Air-borne pulverized coal from, for example, a storage system (not shown) is delivered through a pipe 38 to a tangential inlet 40 centrally located midway the ends of the pulverized coal distributor 37. Controlled amounts of secondary combustoin air are delivered to each of the burners 35 through individual pipes 41 connected with a secondary air manifold 42.

In operation, pulverized coal is passed through the distributor 37 to the pulverized coal burners 35 where the coal and secondary air is mixed for discharge into the combustion space 20. The streams of coal and air are ignited upon leaving the burners and are projected toward the front wall 14 of the furnace, so that the flame and combustion gases will take a U-shaped flow path in moving toward the gas outlet 13 of the furnace. With the construction described, the aluminum on the hearth 11 of the furnace is heated by both radiation and convection, with the convection heat exchange occurring after combustion has been substantially completed and conditions leading to the dissociation of water vapor substantially eliminated. Combustion conditions leading to the production of hydrogen may occur in the space 20 but the hydrogen will recombine with oxygen before the hot gases are in convection heat exchange relationship with molten aluminum. The reversed direction of heating gas flow, and extending flow path encourage a thorough mixing of the combustible constituents so that oxidation of the molten metal is avoided. With a supply of finely pulverized coal delivered to the furnace combustion space, the ash particles released from the fuel will be finely divided and to a large extent pass from the furnace with the flue gases. The remainder of the ash from the fuel will accumulate on the surface of the molten aluminum and will not pass to the holding furnace 25.

A furnace of the type described was constructed with a hearth length of approximately 28 feet and capable of holding a charge of about 8 tons of aluminum. Pulverized coal was supplied to the burners at a maximum rate of approximately 700 pounds per hour, with the coal fineness in excess of 95 percent passing the 200 mesh U. S. standard screen. Under these conditions fuel to aluminum weight ratio was improved at least 50%, with an increased aluminum melting capacity as compared with other fuels and methods of firing. No contamination of the aluminum by hydrogen inclusions has been found after many months of production during which several million pounds of aluminum has been melted. No other problems of metal contamination has been encountered.

While in accordance with the provisions of the statutes I have illustrated and described herein a preferred embodiment of the invention, those skilled in the art will understand that changes may be made in the method of operation and form of the apparatus disclosed without departing from the spirit of the invention covered by my claims, and that certain features of the invention may sometimes be used to advantage without a corresponding use of other features.

What is claimed is:

1. An aluminum melting furnace comprising walls defining a hearth in the lower portion of said furnace, means for charging aluminum into one end of said furnace, a bridge wall defining the maximum molten metal depth on said hearth, means defining a flue gas outlet in the opposite end portion of said furnace and adjacent said bridge wall, roof and walls cooperating to define an upwardly elongated combustion space adjacent the charging end of said furnace, an upright wall positioned intermediate the length of said furnace hearth and defining one wall of said combustion space, one portion of said roof inclined upwardly from adjacent said flue gas outlet means to merge with the lower end portion of said upright wall, and burner means positioned in said upright wall for the introduction of fuel and air into said combustion space and toward the metal charging end of said furnace and for suspension burning in a vertically spaced reverbatory flame path to provide a layer of gaseous products of combustion above the metal on said hearth.

2. An aluminum melting furnace comprising walls confining aluminum metal in the lower portion of said furnace, means for charging said furnace with aluminum metal through an end wall of said furnace, a bridge wall defining the maximum molten metal depth in the lower portion of said furnace, means defining a flue gas outlet from said furnace adjacent the end of said furnace opposite said charging means and adjacent said bridge wall, means cooperating to define a furnace roof inclining upwardly from said flue gas outlet means to a position intermediate the length of said furnace, a transverse upright wall projecting upwardly from the upper end portion of said roof to a roof portion inclined downwardly from said upright wall to the furnace end wall of said metal charging means, and burner means positioned in said upright wall for the introduction of fuel into and toward the charging end of said furnace and for suspension burning in a vertically spaced reverbatory flame path to provide a layer of gaseous products of combustion above the metal on said hearth.

3. An aluminum melting furnace comprising walls confining aluminum metal in the lower hearth portion of said furnace, a bridge wall defining the maximum molten metal depth on said hearth, means for charging said furnace with aluminum metal through an end wall of said furnace, means defining a flue gas outlet from said furnace hearth adjacent the end of said furnace hearth opposite said charging means and adjacent said bridge wall, means cooperating to define a furnace roof portion inclining upwardly from said flue gas outlet means to a position intermediate the length of said furnace hearth, a transverse upright wall projecting upwardly from the upper end portion of said roof portion to a downwardly inclined second roof portion extending from the upper end of said upright wall to the furnace end wall of said metal charging means, and burner means positioned in said upright wall for the introduction of pulverized coal and combustion air into said furnace and for suspension burning in a vertically spaced reverbatory flame path to provide a layer of gaseous products of combustion above the metal on said hearth.

4. A furnace comprising walls defining a hearth, a bridge wall positioned at the rear end of said hearth, means defining a flue gas outlet above said bridge wall, walls defining an upwardly elongated combustion space above and adjacent the front of said hearth including a roof portion inclined downwardly toward the front of said furnace, another roof portion inclined downwardly from said upwardly elongated combustion space to said flue gas outlet defining means, and means for introducing fuel and air into said combustion space and toward the front of said furnace for suspension burning whereby the hot gases are reversed in flow direction above and adjacent the front of said hearth.

References Cited in the file of this patent

UNITED STATES PATENTS

| | | |
|---|---|---|
| 111,614 | Crampton | Feb. 7, 1871 |
| 111,616 | Crampton | Feb. 7, 1871 |
| 740,786 | Uren | Oct. 6, 1903 |
| 912,298 | Evans | Feb. 16, 1909 |
| 1,089,377 | Hibbard | Mar. 3, 1914 |
| 1,687,277 | Alexander | Oct. 9, 1928 |
| 1,904,781 | Crawford | Apr. 18, 1933 |
| 2,298,149 | Morton | Oct. 6, 1942 |
| 2,337,072 | Tarbox | Dec. 21, 1943 |
| 2,470,728 | Sklenar | May 17, 1949 |